US 8,503,442 B2

(12) United States Patent
Miyoshi

(10) Patent No.: US 8,503,442 B2
(45) Date of Patent: Aug. 6, 2013

(54) TRANSMISSION INFORMATION TRANSFER APPARATUS AND METHOD THEREOF

(75) Inventor: Takashi Miyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/274,518

(22) Filed: Nov. 20, 2008

(65) Prior Publication Data
US 2009/0262740 A1 Oct. 22, 2009

(30) Foreign Application Priority Data

Apr. 21, 2008 (JP) ................. 2008-110004

(51) Int. Cl.
H04L 12/56 (2006.01)

(52) U.S. Cl.
USPC .......................... 370/389; 370/392

(58) Field of Classification Search
USPC .................................. 370/389, 392
See application file for complete search history.

(56) References Cited

U.S. PATENT DOCUMENTS

| 6,304,901 | B1 | 10/2001 | McCloghrie et al. |
| 6,590,861 | B1 | 7/2003 | Vepa et al. |
| 6,651,093 | B1 | 11/2003 | Wiedeman et al. |
| 7,469,298 | B2* | 12/2008 | Kitada et al. ........... 709/236 |
| 7,594,029 | B2* | 9/2009 | Fujita et al. ........... 709/244 |
| 7,787,471 | B2* | 8/2010 | Baden et al. ........... 370/395.3 |
| 2002/0012345 | A1* | 1/2002 | Kalkunte et al. ........... 370/389 |
| 2002/0018489 | A1* | 2/2002 | Ambe et al. ........... 370/475 |
| 2002/0021701 | A1* | 2/2002 | Lavian et al. ........... 370/401 |
| 2002/0037163 | A1* | 3/2002 | Clark et al. ........... 388/801 |
| 2002/0110122 | A1* | 8/2002 | Ramfelt et al. ........... 370/389 |
| 2003/0037163 | A1* | 2/2003 | Kitada et al. ........... 709/236 |
| 2003/0152075 | A1* | 8/2003 | Hawthorne et al. ........... 370/389 |
| 2004/0047349 | A1* | 3/2004 | Fujita et al. ........... 370/389 |
| 2006/0114914 | A1* | 6/2006 | Anand et al. ........... 370/395.53 |
| 2006/0120389 | A1* | 6/2006 | Sampath et al. ........... 370/401 |
| 2006/0182118 | A1* | 8/2006 | Lam et al. ........... 370/395.42 |
| 2006/0209807 | A1* | 9/2006 | Lor et al. ........... 370/352 |
| 2006/0251085 | A1* | 11/2006 | Kalkunte et al. ........... 370/400 |
| 2007/0213029 | A1* | 9/2007 | Edney et al. ........... 455/404.1 |
| 2008/0002707 | A1* | 1/2008 | Davis ........... 370/392 |
| 2008/0186965 | A1* | 8/2008 | Zheng et al. ........... 370/389 |
| 2008/0219173 | A1* | 9/2008 | Yoshida et al. ........... 370/241.1 |
| 2008/0228821 | A1* | 9/2008 | Mick et al. ........... 707/104.1 |
| 2008/0247394 | A1* | 10/2008 | Kadambi et al. ........... 370/392 |

FOREIGN PATENT DOCUMENTS

JP 10-190715 7/1998

OTHER PUBLICATIONS

European Search Report dated Jul. 7, 2009, from the corresponding European Application.

* cited by examiner

Primary Examiner — Jay P Patel
(74) Attorney, Agent, or Firm — Fujitsu Patent Center

(57) ABSTRACT

A transmission information transfer apparatus for realizing the MAC VLAN function with low latency includes: a VLAN table memory that manages a VID and a VLAN membership; a VLAN cache which is a cache memory that manages a VLAN Cache Index and VLAN membership in association with one another; an FDB that manages the VID, DA, and output port information in association with one another and further manages the VID, SA, and VLAN Cache Index in association with one another; an extraction section that extracts the VID, DA, and SA included in an input packet; an FDB search section that acquires output port information associated with the VID and DA, as well as the VLAN Cache Index associated with the VID and SA; a table controller that acquires the VLAN membership associated with the VLAN Cache Index; and an output port determination section that determines an output port of a packet.

7 Claims, 9 Drawing Sheets

| TABLE SEARCH KEY | | DATA | |
|---|---|---|---|
| VLAN ID | MAC ADDRESS | OUTPUT PORT INFORMATION | VLAN Cache Index |
| 001h | 00:00:01:23:45:67 | Port 5 | Index=m |
| 001h | 00:00:01:23:45:68 | Port 2 | Index=n |
| ... | ... | ... | ... |

FIG. 4

| VLAN ID | VLAN MEMBER INFORMATION |
|---|---|
| 001h | VLAN1 MEMBER LIST |
| 002h | VLAN2 MEMBER LIST |
| ... | ... |

TABLE SEARCH KEY / DATA

FIG. 5

| VLAN Cache Index | VLAN ID | VLAN MEMBER INFORMATION | PRIORITY |
|---|---|---|---|
| Index=m | 001h | VLAN1 MEMBERSHIP | 1 |
| Index=n | 002h | VLAN2 MEMBERSHIP | 2 |
| ... | ... | ... | ... |

TABLE SEARCH KEY / DATA

FIG. 11

| TABLE SEARCH KEY | | DATA |
|---|---|---|
| VLAN ID | MAC ADDRESS | OUTPUT PORT INFORMATION |
| 003h | 00:00:01:23:45:69 | Port 5 |
| 004h | 00:00:01:23:45:70 | Port 6 |
| ... | ... | ... |

RELATED ART

FIG. 12

| TABLE SEARCH KEY | DATA |
|---|---|
| VLAN ID | VLAN MEMBER INFORMATION |
| 003h | VLAN3 MEMBERSHIP |
| 004h | VLAN4 MEMBERSHIP |
| ... | ... |

RELATED ART

TRANSMISSION INFORMATION TRANSFER APPARATUS AND METHOD THEREOF

BACKGROUND OF THE INVENTION

1. Field of the Invention

The present invention relates to a technique for assigning a VLAN based on a physical address on a network.

2. Description of the Related Art

There is known a VLAN (Virtual LAN) as a technique for dividing a network (broadcast domain) in a Layer 2 Ethernet® switch. The VLAN technique logically divides a network and thereby can divide a network on the same switch. Further, there is known a MAC VLAN as a function for assigning the VLAN based on the physical address (MAC address) of a terminal. The MAC VLAN assigns, to a terminal group consisting of terminals having a specifics physical address, a VLAN ID which is an identifier indicating the same VLAN, i.e., a specific VLAN. Further, the MAC VLAN has a function of assigning, to an unauthenticated terminal, i.e., a terminal whose MAC address has not been registered in the Ethernet switch, a VLAN ID different from the abovementioned VLAN ID.

A configuration of a conventional L2 (Layer 2) switch having a MAC VLAN function will be described using the drawings. FIG. 9 is a block diagram showing a configuration of the conventional L2 switch having a MAC VLAN function. FIG. 10 is a view showing a MAC VLAN table memory in the conventional L2 switch having a MAC VLAN function. FIG. 11 is a view showing an FDB (Forwarding DataBase) in the conventional L2 switch having a MAC VLAN function. FIG. 12 is a view showing a VLAN table memory in the conventional L2 switch having a MAC VLAN function.

As shown in FIG. 9, a conventional L2 switch 7 having the VLAN function includes a switch LSI 51, an input port 52, an output port 53, a CPU 54, and an external I/F 55. The switch LSI 51 includes a MAC VLAN table search section 511, a MAC VLAN table memory 512, a VLAN table memory 513, a VLAN table search section 514, an FDB 515, an FDB search section 516, and an output port determination section 517. The input port 52 is a port to which a packet is input. The output port 53 is a port that outputs a packet input via the input port. The CPU 54 passes, to the VLAN table search section 514, information received from a console via the external I/F 55 which is an interface between the Ethernet switch and console.

The MAC VLAN table memory 512 is a memory for storing an SA (Source address: address indicating transmission source of packet) formed by a MAC address which is a 48-bit physical address and a VLAN ID which is a 12-bit identifier in association with one another, as shown in FIG. 10. The MAC VLAN table memory 512 is constituted by a CAM or a hash table. The MAC VLAN table search section 511 searches the VLAN table memory 512 using the SA formed by a MAC address as a table search key to acquire the VLAN ID associated with the MAC address as data.

The FDB 515 is a database for managing the VLAN ID, a DA (Destination address: address indicating destination of packet) formed by the MAC address, and output port information indicating a specific output port in association with one another, as shown in FIG. 11. Since the FDB 515 has a large number of entries (up to 32K) and a large search key size (bit), it is generally constituted as a hash table. The FDB search section 516 searches the FDB 515 using the DA formed by the MAC address as a table search key to acquire the output port information associated with the MAC address as data.

The VLAN table memory 513 is a memory for managing the VLAN ID and VLAN member information indicating VLAN membership in association with one another, as shown in FIG. 12. Since the VLAN table memory 513 requires 4096 entries, it is constituted by an SRAM. The table controller 514 searches the VLAN table memory 513 using the VLAN ID as a table search key to acquire VLAN member information as data.

Operation of the conventional L2 switch having a MAC VLAN function will next be described. FIG. 13 is a flowchart showing operation of the conventional L2 switch having a MAC VLAN function.

When a packet is input to the input port, the MAC VLAN table search section 511 extracts the DA, SA, and VLAN ID (hereinafter, referred to as "VID") from the packet that has been input (hereinafter, referred to as "input packet") (S501). The DA and SA each are the MAC address. The MAC VLAN table search section 511 then determines whether a port to which the input packet has been input is a port for MAC VLAN (S502).

In the case where the port to which the input packet has been input is a port for MAC VLAN (YES in S502), the MAC VLAN table search section 511 searches the MAC VLAN table memory 512 using the MAC address (SA) as a table search key to acquire the VID as data (S503). Further, the MAC VLAN table search section 511 assigns the VID to a variable VID1 as VID' (S504).

Subsequently, the FDB search section 516 searches the FDB 515 using the MAC address (as VID1 and DA) as a table search key to acquire the output port information as data (S505a). The table controller 514 searches the VLAN table memory 513 using the VID1 as a table search key to acquire the VLAN member information as data (S505b). The steps S505a and S505b are executed at the same timing.

After the output port information and VLAN member information are obtained by the FDB search section 516 and VLAN table search section 514, the output port determination section 506 determines an output port of the input packet based on the output port information and VLAN member information (S506).

In the case where it is determined in step S502 that the port to which the input packet has been input is not a port for MAC VLAN (NO in S502), the MAC VLAN table search section 511 assigns the VID included in the input packet to the variable VID1 (S507).

As described above, the conventional L2 switch having a VLAN function uses the SA as an argument to acquire the VID' which is a previously set VID and obtain the output port information and VLAN member information based on the VID' and DA. Further, the conventional L2 switch having a MAC VLAN function determines an output port based on the output port information and VLAN member information.

As a conventional art relating to the present invention, there is known a network switching system that reduces the traffic of a main router so as to reduce cost (refer to, e.g., Patent Document 1: Jpn. Pat. Appln. Laid-Open Publication No. 10-190715).

When the conventional L2 switch does not use the MAC VLAN function, it can obtain the output port information and VLAN information by using the VID and DA included in the input packet. On the other hand, when the conventional L2 switch uses the MAC VLAN function, it needs to perform a process of obtaining the VID' by using the SA as an argument in order to acquire the output port information and VLAN information. The increase in the number of processes may increase latency in packet transfer as compared to the case where the MAC VLAN function is not used.

SUMMARY OF THE INVENTION

The present invention has been made to solve the above problem, and an object thereof is to provide a transmission information transfer apparatus and its method capable of realizing the MAC VLAN function with low latency.

To solve the above problem, according to a first aspect of the present invention, there is provided a transmission information transfer apparatus that uses a plurality of input/output sections to input/output transmission information, including: a first storage section that stores, in a memory, a first identifier which is an identifier indicating a previously set network and input/output section information which has previously been set for the first identifier and which indicates any one of the plurality of input/output sections that belongs to the previously set network in association with one another; a second storage section that stores, in a cache memory, a predetermined index and input/output section information stored in the memory by the first storage section in association with one another; a first management section that manages a second identifier which is an identifier indicating a predetermined network, a destination address which is a physical address indicating the destination of the transmission information, and output destination information which is information indicating any one of the plurality of input/output sections as the destination of the transmission information in association with one another; a second management section that manages the second identifier, a transmission source address which is a physical address indicating the transmission source of the transmission information, and the predetermined index in association with one another; an extraction section that extracts the second identifier, destination address, and transmission source address included in input transmission information which is transmission information input to any one of the plurality of input/output sections; a first acquisition section that acquires output destination information that has been associated by the first management section with the second identifier and destination address extracted by the extraction section, as well as predetermined index that has been associated by the second management section with the second identifier and transmission source address extracted by the extraction section; a second acquisition section that acquires the input/output section information that is stored in the second storage section in association with the predetermined index acquired by the first acquisition section; and an output destination determination section that determines any one of the plurality of input/output sections as output destination of the input transmission information based on the output destination information acquired by the first acquisition section and input/output section information acquired by the second acquisition section.

Further, according to a second aspect of the present invention, there is provided a transmission information transfer method that uses a plurality of input/output sections to input/output transmission information, including: a first storage step that stores, in a memory, a first identifier which is an identifier indicating a previously set network and input/output section information which has previously been set for the first identifier and which indicates any one of the plurality of input/output sections that belongs to the previously set network in association with one another; a second storage step that stores, in a cache memory, a predetermined index and input/output section information stored in the memory by the first storage step in association with one another; a first management step that manages a second identifier which is an identifier indicating a predetermined network, a destination address which is a physical address indicating the destination of the transmission information, and output destination information which is information indicating any one of the plurality of input/output sections as the destination of the transmission information in association with one another; a second management step that manages the second identifier, a transmission source address which is a physical address indicating the transmission source of the transmission information, and the predetermined index in association with one another; an extraction step that extracts the second identifier, destination address, and transmission source address included in input transmission information which is transmission information input to any one of the plurality of input/output sections; a first acquisition step that acquires output destination information that has been associated by the first management step with the second identifier and destination address extracted by the extraction step, as well as predetermined index that has been associated by the second management step with the second identifier and transmission source address extracted by the extraction step; a second acquisition step that acquires the input/output section information that is stored by the second storage step in association with the predetermined index acquired by the first acquisition step; and an output destination determination step that determines any one of the plurality of input/output sections as output destination of the input transmission information based on the output destination information acquired by the first acquisition step and input/output section information acquired by the second acquisition step.

According to the present invention, a MAC VLAN function can be realized with low latency.

BRIEF DESCRIPTION OF THE DRAWINGS

FIG. 4 is a view showing a VLAN table memory;

FIG. 5 is a view showing a VLAN cache;

FIG. 11 is a view showing an FDB in the conventional L2 switch having a MAC VLAN function;

FIG. 12 is view showing a VLAN table memory in the conventional L2 switch having a MAC VLAN function.

DETAILED DESCRIPTION OF THE PREFERRED EMBODIMENTS

The present invention enables parallel execution of table access operations at the time of use of a MAC VLAN function by retaining VLAN information as a high-speed accessible cache entry (VLAN Cache). An embodiment of the present invention will be described below with reference to the accompanying drawings.

Figure 1:
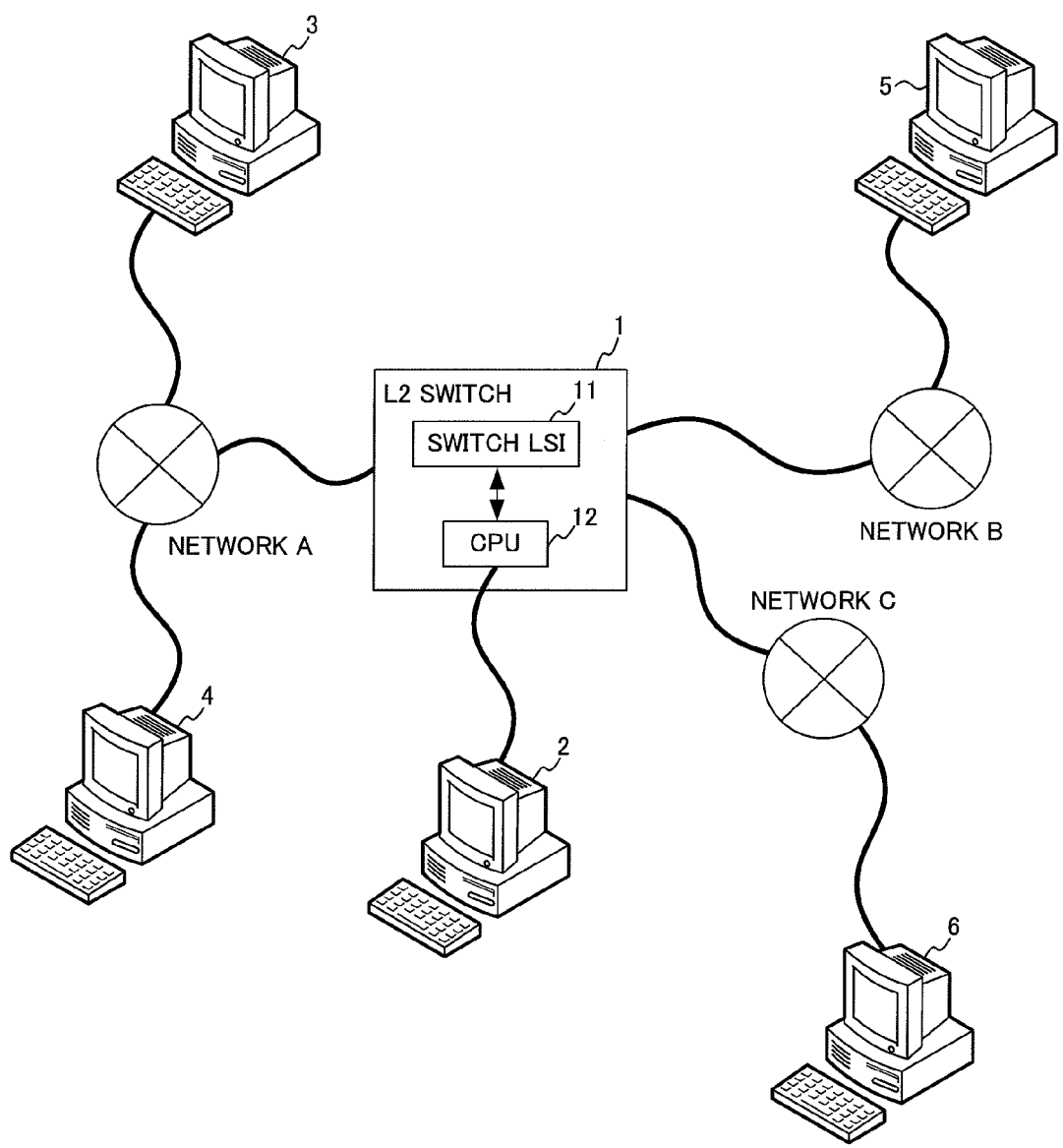
FIG. 1 is a view showing the entire configuration of an embodiment of the present invention.

First, the entire configuration of the embodiment of the present invention will be described. FIG. 1 is a view showing the entire configuration of the embodiment of the present invention.

As shown in FIG. 1, the present embodiment is constituted by an L2 switch 1, a management node 2 for setting the L2 switch 1, nodes 3 and 4 which are connected to a network A and serve as packet transmission sources, a node 5 which is connected to a network B and serves as a packet transmission source, and a node 6 which is connected to a network C and serves as a packet transmission source. The L2 switch 1 includes a switch LSI 11 and a CPU 12 for managing the setting of the switch LSI 111 and is connected to the network A to C by input and output ports to be described later. The CPU 12 receives a setting instruction from the management node 2 via an external I/F to be described later.

Figures 2, 3:
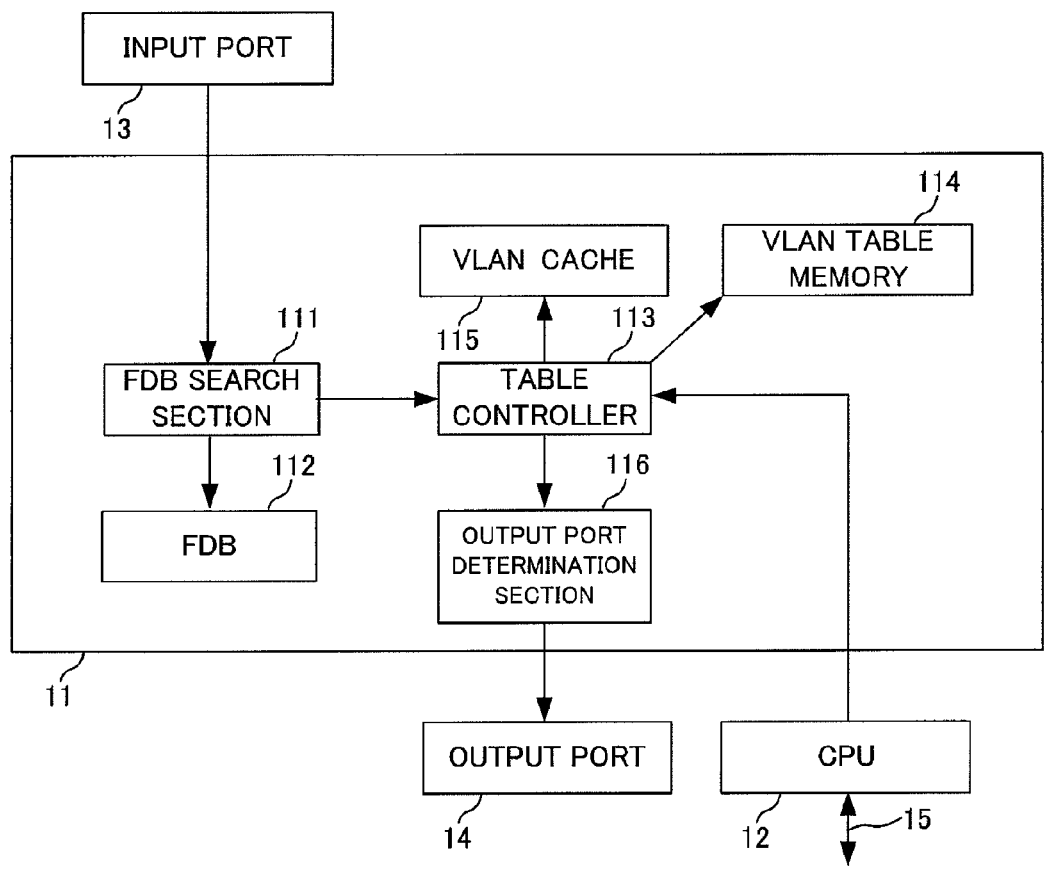
FIG. 2 is a block diagram showing a configuration of an L2 switch according to the present invention.
FIG. 3 is a view showing an FDB.

A configuration of the L2 switch according to the present embodiment will be described. FIG. 2 is a block diagram showing a configuration of the L2 switch according to the present invention. FIG. 3 is a view showing an FDB. FIG. 4 is a view showing a VLAN table memory. FIG. 5 is a view showing a VLAN cache.

As shown in FIG. 2, the L2 switch 1 according to the present embodiment is constituted by a switch LSI 11, a CPU 12, an input port 13 (input section), an output port 14 (output section), and an external I/F 15. The switch LSI 11 includes an FDB search section 111 (extraction section, first acquisition section), an FDB 112 (first management section, second management section), a table controller 113 (second acquisition section, third acquisition section, input/output information update section), a VLAN table memory 114 (first storage section), a VLAN cache 115 (second storage section), and an output port determination section 116 (output destination determination section).

The input port 13, which is constituted by a plurality of input ports, is connected to the network A and inputs a packet transmitted from the node 3 or node 4 to the L2 switch 1. Whether or not to use a MAC VLAN function has been set in the input port 13. The output port 14, which is constituted by a plurality of output ports, outputs a packet input to the input port 13 (hereinafter, referred to as "input packet") to the node 5 connected to the network B or node 6 connected to the network C. The networks A and B are connected to output ports belonging to different VLANs. Although the input ports 13 and output ports 14 are ports that can be used for input and output, the following description is made assuming that the input port 13 is a port for input only and output port 14 is a port for output only, for the sake of simplicity.

As shown in FIG. 3, the FDB 112 is a database for managing a VLAN ID (hereinafter, referred to as "VID" (second identifier)) serving as a table search key (hereinafter, referred to as "key"), a MAC address, output port information (output destination information) serving as data corresponding to the key, and a VLAN cache Index in association with one another. The MAC address managed in the FDB 112 includes a MAC address (transmission source address) serving as an SA and a MAC address (destination address) serving as a DA. The FDB 112 is implemented as a hash table. The FDB search section 111 uses the VID and DA included in an input packet (input transmission information) to search the FDB 112 to acquire the output port information as data. Further, at the same timing, the FDB search section 111 searches the FDB 112 using the VID and SA included as the input packet as search keys to acquire the VLAN cache INDEX as data.

As shown in FIG. 4, the VLAN table memory 114 is a memory for storing the VID (second identifier) serving as a key and VLAN member information indicating VLAN membership (port belonging to VID, input/output section information) in association with one another. Since the VLAN table memory 114 requires 4096 entries, it is constituted by an SRAM. The VID and VLAN membership in the VLAN table are set by the management node 2.

As shown in FIG. 5, the VLAN cache 115 is a cache memory for the VLAN table memory 114, which manages the VLAN Cache Index serving as a key, VID serving as data, VLAN member information, and priority (attribute information) in association with one another. Note that, the smaller the priority value is, the higher the priority level is. The VLAN cache 115 is constituted by a memory (to be more precise, flip-flop) having an access speed higher than the SRAM constituting the VLAN table memory 114. The VLAN cache 115 is set as a Full Associative memory for the VLAN table memory 114. This makes it easy to maintain coherence between the VLAN table memory 114 and VLAN cache.

The table controller 113 sets the content of the VLAN table memory 114 according to an instruction from the CPU 12. The table controller 113 copies the VID and VLAN member information in the VLAN table memory 114 to the VLAN cache 115 to thereby maintain coherence between the VLAN table memory 114 and VLAN cache 115. Further, the table controller 113 searches the VLAN cache 115 using the VLAN ID as a search key to acquire the VLAN member information and its priority.

The output port determination section 116 selects, from the plurality of output ports constituting the output port 14, an output port to which the input packet is transferred based on the output port information and VLAN member information.

Figure 6:
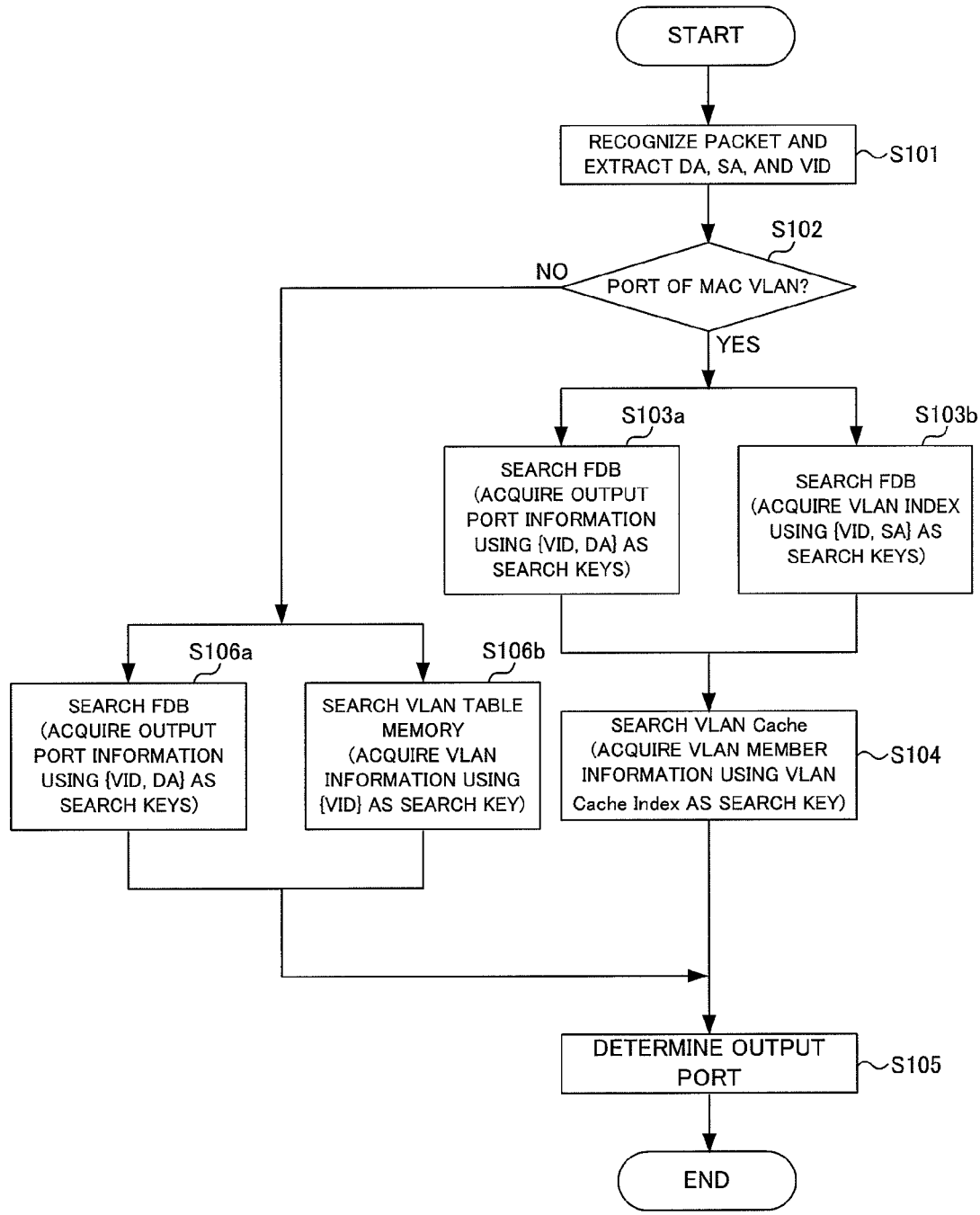
FIG. 6 is a flowchart showing operation of output port determination processing.

Next, output port determination processing performed by the L2 switch 1 according to the present embodiment will be described. FIG. 6 is a flowchart showing operation of the output port determination processing. It is assumed, in FIG. 6, that the coherence between the VLAN table memory and VLAN cache is maintained by VLAN cache update processing to be described later. Further, it is assumed that information concerning a packet to be input has been registered in the FDB 112.

The FDB search section 111 recognizes an input packet input to the input port 13 and extracts the MAC address serving as a DA, MAC address serving as an SA, and VID, from the input packet (S101, extraction step). Subsequently, the FDB search section 111 determines whether the input port 13 to which the input packet has been input is a port for MAC VLAN, i.e., whether the input port 13 to which the input packet has been input is a port using the MAC VLAN function (S102).

In the case where the input port 13 to which the input packet has been input is a port for MAC VLAN (YES in S102), the FDB search section 111 searches the FDB 112 using the VID and DA included in the input packet as keys to acquire the output port information as data (S103a, first acquisition step). At the same time, the FDB search section 111 searches the FDB 112 using the VID and SA included in the input packet as keys to acquire the VLAN cache Index as data (S103b, first acquisition step).

Subsequently, the table controller 113 searches the VLAN cache 115 using the VLAN Cache Index acquired by the FDB search section 111 as a key to acquire the VLAN member information and its priority as data (S104, second acquisition step).

After acquisition of the VLAN member information, the output port determination section 116 determines an output port 14 to which the input packet is transferred based on the output port information and VLAN member information (S116, output destination determination step).

In step S102, in the case where the input port 13 to which the input packet has been input is not a port for MAC VLAN (NO in S102), the FDB search section 111 searches the FDB 112 using the VID and DA included in the input packet as keys to acquire the output port information as data (S106a). At the same timing, the VLAN table controller 111 searches the VLAN table memory 114 using the VID included in the input packet as keys to acquire the VLAN member information as data (S106b).

After acquisition of the output port information and VLAN member information, the output port determination section 116 determines an output port 14 to which the input packet is transferred based on the output port information and VLAN member information (S116).

The priority acquired in step S104 is the priority for a predetermined VLAN in a packet transfer process, and it is assumed that a packet is preferentially transferred to a VLAN having a higher priority.

As described above, in order to determine an output port 14 to which the input packet is transferred, the L2 switch 1 according to the present embodiment acquires the output port information from the VID and DA and, at the same time, acquires the VLAN Cache Index from the VID and SA. Then, the L2 switch 1 according to the present embodiment acquires the VLAN member information from the acquired VLAN Cash Index. As described above, two-step procedures are required for the L2 switch 1 according to the present embodiment to acquire the information (output port information, VLAN member information) required for determining the output port 14. However, since the VLAN cache 115 is constituted by a high-speed accessible flip-flop, the processing time required to acquire the VLAN member information from the VLAN Cache Index can be ignored, thereby reducing the latency involved in the MAC VLAN function. Further, the FDB search operations using the SA and DA are performed in parallel, so that it is possible to avoid order restriction (restriction that VID is first acquired using the SA as a key and then the subsequent search operation is performed using the acquired VID and DA as keys) of MAC VLAN function existing in the conventional technique. Further, by adding, to the VLAN cache, an attribute (priority, in this embodiment) that is not included in the VLAN table memory, it is possible to expand the VLAN table memory. For example, by setting the priority for the VLANs as in the case of the present embodiment, it is possible to preferentially transfer a packet on a specific VLAN.

Figure 7:
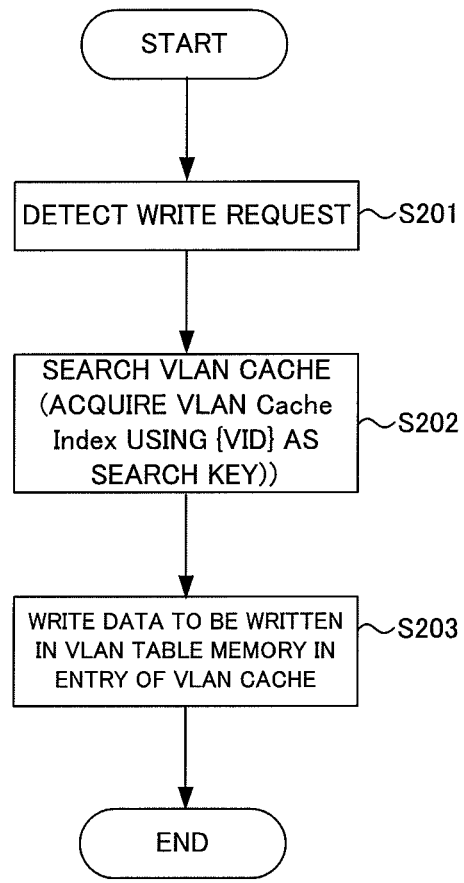
FIG. 7 is a flowchart showing operation of VLAN cache update processing.

Next, VLAN cache update processing will be described. FIG. 7 is a flowchart showing operation of the VLAN cache update processing. The VLAN cache update processing is processing for maintaining coherence between the VLAN table memory 114 and VLAN cache 115. It is assumed in FIG. 7 that L2 switch 1 has already received a setting change request of the VLAN table memory from the management node 2 via the external I/F 15, and the CPU 12 has requested the VLAN table controller 113 to write data in the VLAN table memory.

The VLAN table controller 113 detects the write request issued from the CPU 12 (S201) and searches the VLAN cache 115 using a VID to be written in the VLAN table memory 114 as a search key to thereby acquire the VLAN Cache Index as data (S202, input/output information update step).

The VLAN table controller 113 then copies the data to be written in the VLAN table memory and stores the copied data in the entry of the acquired VLAN Cache Index (S203, input/output information update step).

With the above VLAN cache update processing, it is possible to maintain coherence between the VLAN table memory 114 and VLAN cache 115.

Figure 8:
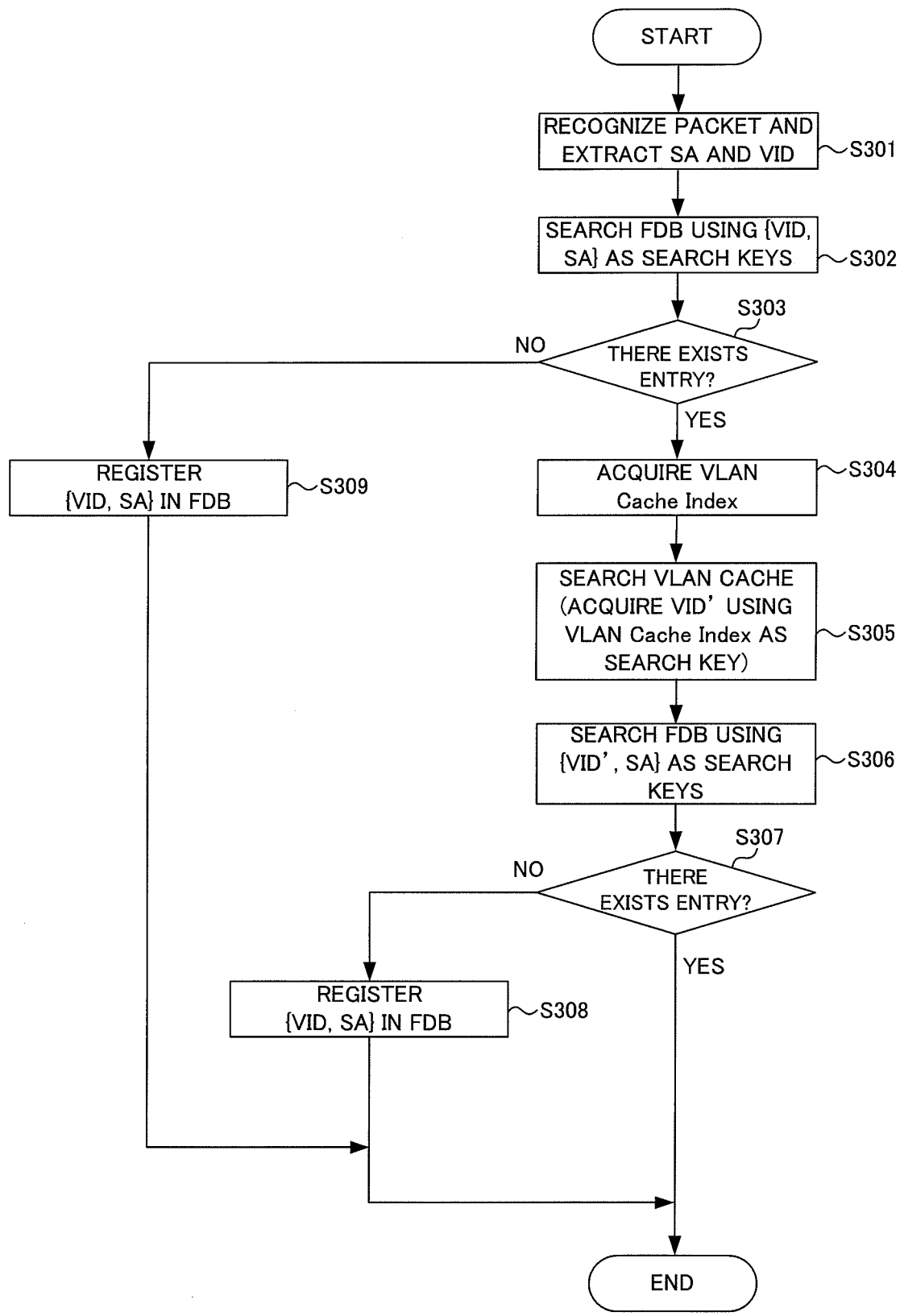
FIG. 8 is a flowchart showing operation of address registration processing.
Figures 9, 10:
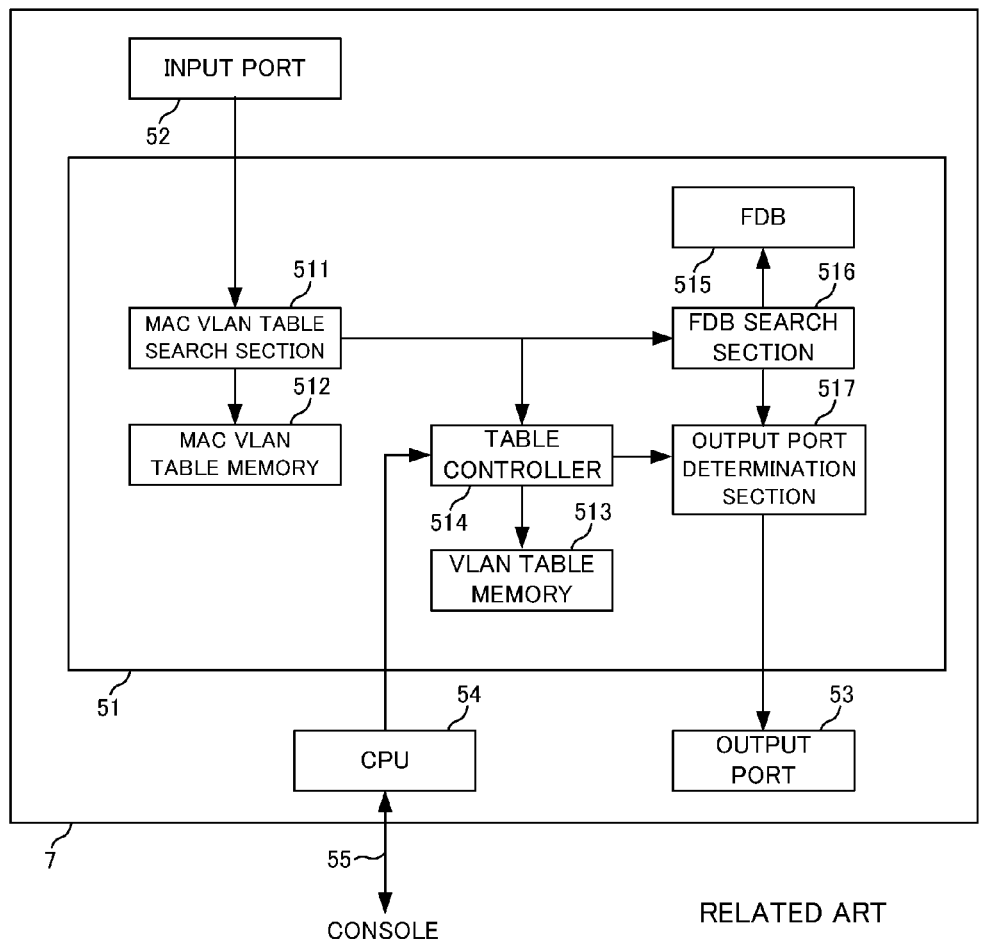
FIG. 9 is a block diagram showing a configuration of a conventional L2 switch having a MAC VLAN function.
FIG. 10 is a view showing a MAC VLAN table memory in the conventional L2 switch having a MAC VLAN function.
Figure 13:
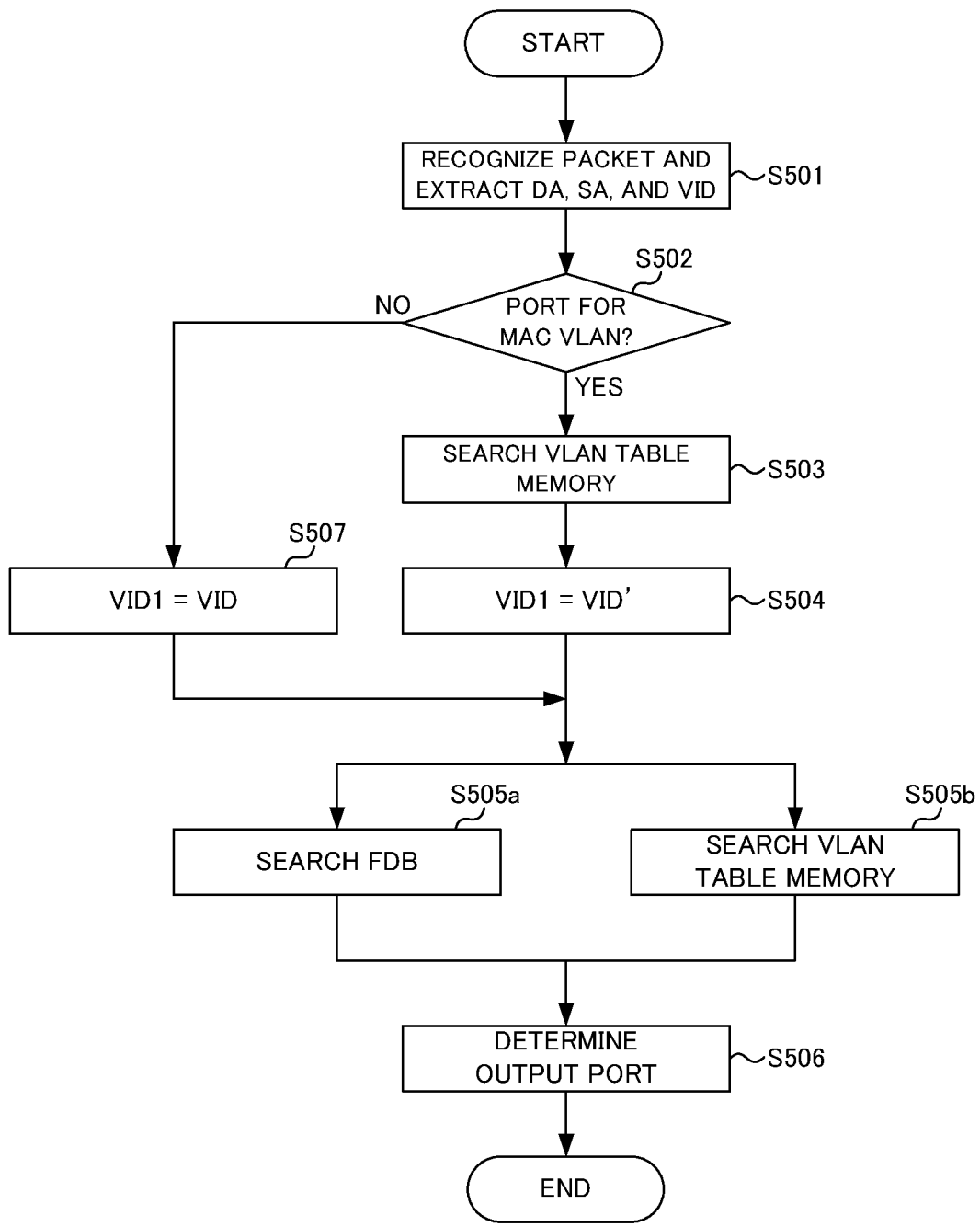
FIG. 13 is a flowchart showing operation of the conventional L2 switch having a MAC VLAN function.

Next, address registration processing will be described. FIG. 8 is a flowchart showing operation of the address registration processing. The address registration processing is processing of registering, in the FDB 112, the MAC address serving as an SA included in a packet transmitted from an unregistered node.

The FDB search section 111 recognizes an input packet and extracts the VID and SA from the input packet (S301). Then, the FDB search section 111 searches the FDB 112 (S302) uses the VID and SA as search keys to determine whether there exists an entry corresponding to the VID and SA in the FDB 112 (S303).

In the case where there exists an entry corresponding to the VID and SA in FDB 112 (YES in S303), the FDB search section 111 acquires the Cache Index using the VID and SA as a search key (S304).

After the VLAN Cache Index has been acquired by the FDB search section 111, the table controller 113 searches the VLAN cache 115 using the VLAN Cache Index as a key to acquire the VID as VID' (first identifier) (S306, third acquisition step).

After the VID' has been acquired by the table controller 113, the FDB search section 111 uses the VID' and SA to search the FDB 112 (S306) to determine whether there exists an entry corresponding to the VID' and SA in the FDB 112 (S307).

In the case where there exists an entry corresponding to the VID' and SA in the FDB 112 (YES in S307), the FDB search section 111 ends this processing.

On the other hand, in the case where there is no entry corresponding to the VID' and SA in the FDB 112 (NO in S307), the FDB search section 111 registers the VID' and SA in the FDB 112 (S308, first management step).

Further, in the case where there is no entry corresponding to the VID and SA in FDB 112 (NO in S303), the FDB search section 111 registers the VID and SA in the FDB (S309, first management step).

The VLAN cache 115, which is a cache memory that puts more emphasis on access speed than capacity, has a smaller capacity than a general memory, so that it may be configured that coherence is maintained only for a particular entry. For example, it may be configured that, at the timing at which the FDB search section 111 recognizes the packet and extracts the DA, SA, and VID, coherence is maintained only for an entry that is likely to be searched for by these information.

As described above, by automatically registering the VLAN ID and physical address in the L2 switch 1, it is possible to reduce overhead associated with the address registration processing performed by management software (software operating in the management node 2 for registering the MAC address in the VLAN table memory 114). This results in a reduction in the amount of communication data between the switch LSI 11 and CPU 12.

The present invention can be embodied in various forms, without departing from the spirit or the main feature. Therefore, the aforementioned embodiments are merely illustrative of the invention in every aspect, and not limitative of the same. The scope of the present invention is defined by the appended claims, and is not restricted by the description herein set forth. Further, various changes and modifications to be made within the scope of the appended claims and equivalents thereof are to fall within the scope of the present invention.

What is claimed is:

1. A transfer apparatus comprising:
a memory configured to store correspondence among a VLAN identifier, a MAC address, a port identifier and an index;
a cache memory configured to store both a VLAN member in the index order and priority information corresponding to the VLAN member, an access to the cache memory being faster than an access to the memory;
an extraction unit configured to extract a destination MAC address, a source MAC address and a VLAN identifier from an input packet;
a search unit configured to search an output port identifier using the extracted VLAN identifier and the extracted destination MAC address from the memory, and an index corresponding to the extracted VLAN identifier and the extracted source MAC address from the memory in parallel;
controller configured to search a VLAN member and priority information using the searched index from the cache memory;
determination unit to determine an output port identifier from the searched output port identifier and the searched VLAN member; and
an output port corresponding to the determined output port identifier and configured to output an output packet based on the searched priority information.

2. The transfer apparatus according to claim 1, further comprising
a table memory configured to store a VLAN identifier and VLAN member information including input/output information which belongs to the VLAN identifier, wherein
when the VLAN member information stored in the table memory is updated, the controller means changes the VLAN member stored in the cache memory based on the updated VLAN member information.

3. The transfer apparatus according to claim 1, wherein when the search unit fails to search the index using the extracted VLAN identifier and the extracted source MAC address from the memory, the search unit registers the extracted VLAN identifier and the extracted source MAC address into the memory.

4. A transfer method comprising:
extracting a destination MAC address, a source MAC address and a VLAN identifier from an input packet;
searching an output port identifier using the extracted VLAN identifier and the extracted destination MAC address from the memory, and an index corresponding to the extracted VLAN identifier and the extracted source MAC address from the memory in parallel, the memory storing correspondence among a VLAN identifier, a MAC address, a port identifier and an index;
searching a VLAN member and priority information using the searched index from a cache memory, the cache memory storing a VLAN member in the index order and priority information corresponding to the VLAN member, an access to the cache memory being faster than an access to the memory;
determining an output port identifier from the searched output port identifier and the searched VLAN member; and
outputting an output packet based on the searched priority information by using an output port corresponding to the determined output port identifier.

5. The transfer method according to claim 4, further comprising:
changing, when VLAN member information stored in a table memory is updated, the VLAN member stored in the cache memory based on the updated VLAN member information, the table memory storing a VLAN identifier and VLAN member information including input/output information which belongs to the VLAN identifier.

6. The transfer method according to claim 4, further comprising
registering, when the searching fails to search the index using the extracted VLAN identifier and the extracted source MAC address from the memory, the extracted VLAN identifier and the extracted source MAC address are registered into the memory.

7. A transfer apparatus comprising:
a memory configured to store correspondence among a VLAN identifier, a MAC address, a port identifier and an index;
a cache memory configured to store both a VLAN member in the index order and priority information corresponding to the VLAN member, an access to the cache memory being faster than an access to the memory; and
a processor configured to execute a procedure, the procedure comprising:
extracting a destination MAC address, a source MAC address and a VLAN identifier from an input packet;
searching an output port identifier using the extracted VLAN identifier and the extracted destination MAC address from the memory, and an index corresponding to the extracted VLAN identifier and the extracted source MAC address from the memory in parallel;
searching an VLAN member and priority information using the searched index from the cache memory;
determining an output port identifier from the searched output port identifier and the searched VLAN member; and
outputting an output packet based on the searched priority information by using an output port corresponding to the determined output port identifier.

* * * * *